(12) United States Patent
Arai

(10) Patent No.: US 10,423,004 B2
(45) Date of Patent: Sep. 24, 2019

(54) OPTICAL DEVICE, TELESCOPE AND BINOCULAR TELESCOPE

(71) Applicant: NIKON VISION CO., LTD., Shinagawa-ku, Tokyo (JP)

(72) Inventor: Satoshi Arai, Kawasaki (JP)

(73) Assignee: Nikon Vision Co., Ltd., Tokyo (JP)

(*) Notice: Subject to any disclaimer, the term of this patent is extended or adjusted under 35 U.S.C. 154(b) by 453 days.

(21) Appl. No.: 15/136,617

(22) Filed: Apr. 22, 2016

(65) Prior Publication Data

US 2016/0313570 A1 Oct. 27, 2016

Related U.S. Application Data

(63) Continuation of application No. PCT/JP2014/005292, filed on Oct. 20, 2014.

(30) Foreign Application Priority Data

Oct. 22, 2013 (JP) ................................. 2013-219235

(51) Int. Cl.
*G02B 23/00* (2006.01)
*G02B 27/64* (2006.01)
(Continued)

(52) U.S. Cl.
CPC ........... *G02B 27/646* (2013.01); *G02B 13/02* (2013.01); *G02B 23/02* (2013.01); *G02B 23/18* (2013.01);
(Continued)

(58) Field of Classification Search
CPC ........ G02B 13/02; G02B 13/04; G02B 23/02; G02B 23/18; G02B 27/0018; G02B 27/64;
(Continued)

(56) References Cited

U.S. PATENT DOCUMENTS 4,978,205 A * 12/1990 Sato ...................... G02B 27/64
359/557
6,226,122 B1 5/2001 Sugawara
(Continued)

FOREIGN PATENT DOCUMENTS

JP 02-234115 A 9/1990
JP 09-251127 A 9/1997
(Continued)

OTHER PUBLICATIONS

English Translation of International Preliminary Report on Patentability from International Patent Application No. PCT/JP2014/005292, dated May 6, 2016.
(Continued)

*Primary Examiner* — Mustak Choudhury
(74) *Attorney, Agent, or Firm* — Shapiro, Gabor and Rosenberger, PLLC

(57) ABSTRACT

Provided is a telescope (TSC) having: an objective optical system (OB); an erecting optical system (PR) for erecting an image formed by the Objective optical system (OB); and an eyepiece optical system (EP) for observing the image which is formed by the Objective optical system (OB) and erected by the erecting optical system (PR). The objective optical system (OB) includes, in order from an object, a first lens group (G1) having positive or negative refractive power, a second lens group (G2) having positive refractive power, and a third lens group (G3) having negative refractive power. The second lens group (G2) and the third lens group (G3) rotate together around a point (O) on the optical axis of the Objective optical system (OB) in order to correct the image.

25 Claims, 11 Drawing Sheets

(51) Int. Cl.
  *G02B 13/02* (2006.01)
  *G02B 23/02* (2006.01)
  *G02B 27/00* (2006.01)
  *G02B 25/00* (2006.01)
  *G02B 23/18* (2006.01)

(52) U.S. Cl.
  CPC ....... *G02B 25/001* (2013.01); *G02B 27/0025* (2013.01); *G03B 2205/0007* (2013.01)

(58) Field of Classification Search
  CPC .. G02B 27/646; G02B 25/001; G02B 25/004; G02B 25/007; G02B 25/008; G02B 5/04; G02B 5/06; G02B 7/28; G02B 35/08; G03B 2205/0007; G03B 2207/005
  USPC ....... 359/364, 399, 407, 412, 431, 433, 554, 359/557, 646, 661, 676, 677, 680, 691, 359/694, 723, 726, 728, 793, 819
  See application file for complete search history.

(56) References Cited

U.S. PATENT DOCUMENTS 6,781,755 B2  8/2004  Yoneyama
6,919,998 B2  7/2005  Momoki
2012/0212584 A1*  8/2012  Chen .................. G03B 35/08 348/47

FOREIGN PATENT DOCUMENTS

| JP | 2002-267947 A | 9/2002 |
| JP | 2003-057537 A | 2/2003 |
| JP | 3548539 B2 | 7/2004 |
| JP | 2008-040065 A | 2/2008 |
| JP | 2008040065 A * | 2/2008 |
| JP | 2008040065 A * | 2/2008 |
| JP | 5028009 B2 | 9/2012 |
| JP | 2013-025278 A | 2/2013 |

OTHER PUBLICATIONS

Office Action dated Sep. 29, 2017 in Chinese Patent Application No. 201480057835.9.
International Search Report from International Patent Application No. PCT/JP2014/005292, dated Jan. 20, 2015.
Office Action dated Jan. 17, 2017, in Japanese Patent Application No. 2015-543708.

* cited by examiner

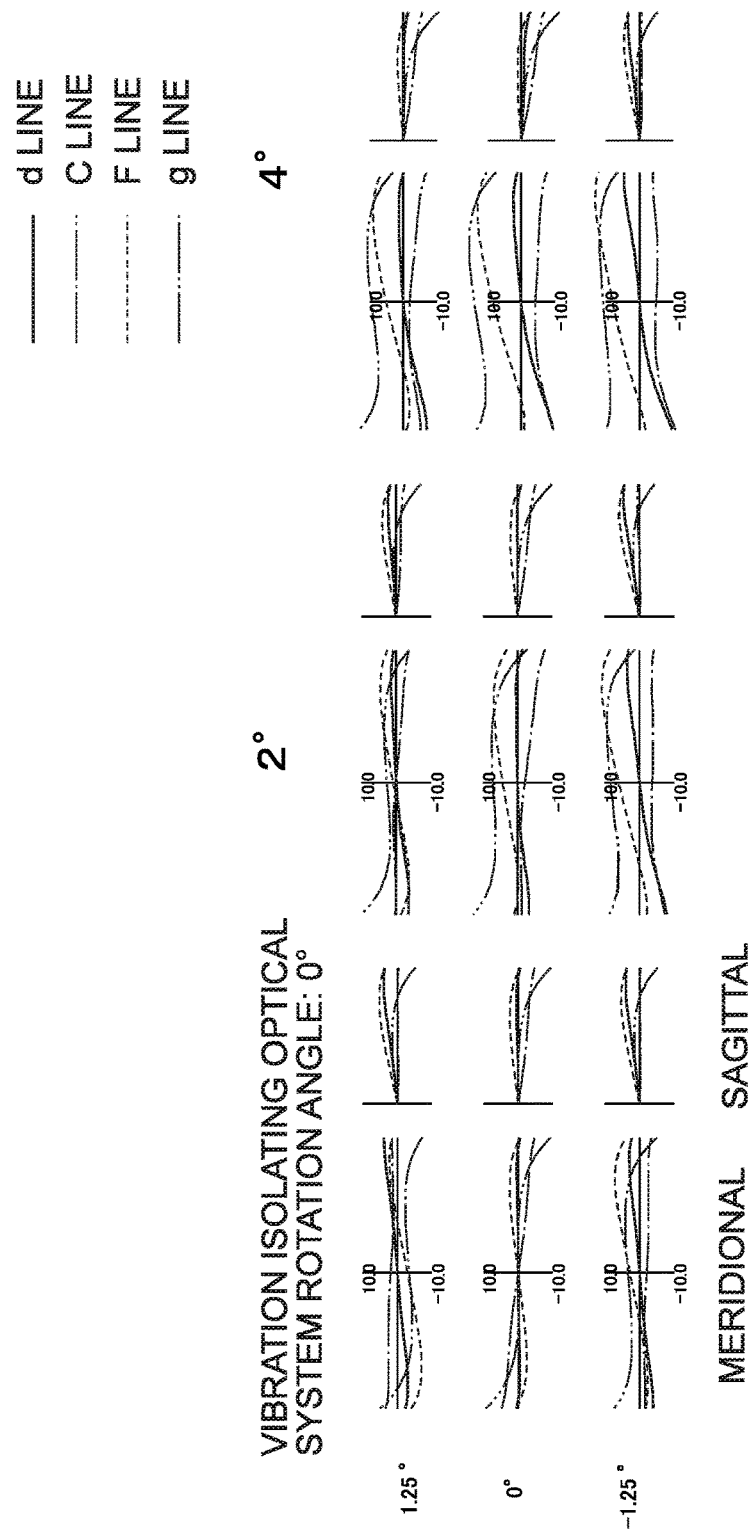

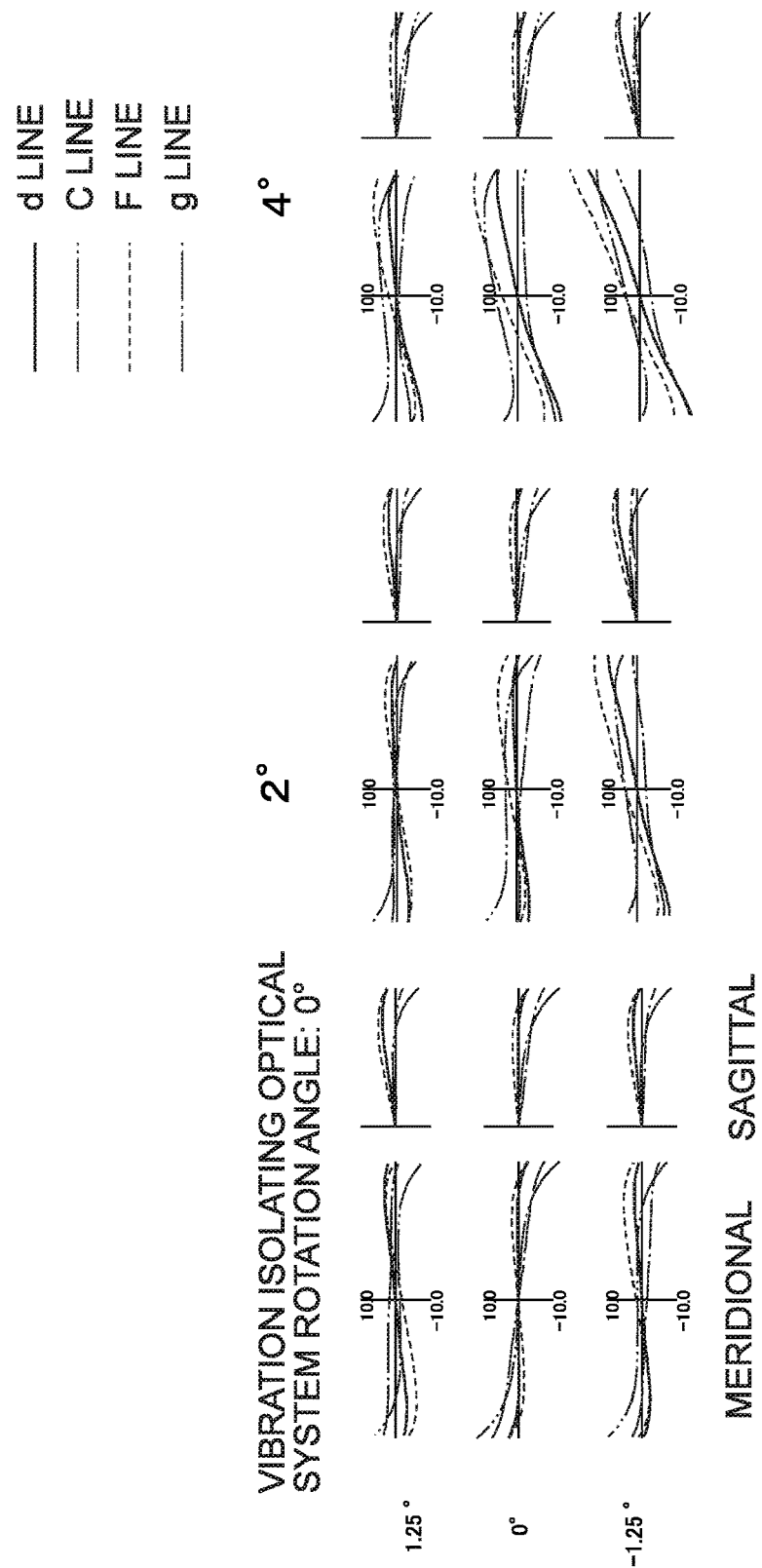

OPTICAL DEVICE, TELESCOPE AND BINOCULAR TELESCOPE

RELATED APPLICATIONS

This is a continuation of PCT International Application No. PCT/JP2014/005292, filed on Oct. 20, 2014, which is hereby incorporated by reference. This application also claims the benefit of Japanese Patent Application No. 2013-219235, filed in Japan on Oct. 22, 2013, which is hereby incorporated by reference.

TECHNICAL FIELD

The present invention relates to an optical device, such as a telescope and a binocular telescope, and more particularly to an image-shake preventing function of an optical device, which corrects an image in response to image shake or vibration of the device, so as to enable stable observation.

TECHNICAL BACKGROUND

In order to reduce the influence of vibration, such as image shake, on an image, a correction optical system has been shifted or tilted in prior arts. For example, a first method of shifting or tilting the correction optical system is shifting the correction optical system in a direction perpendicular to the optical axis of the objective optical system (e.g. see Patent Document 1). In this method, the image-shake preventing mechanism can be simplified, but a change in and deterioration of the image caused by the shift of the correction optical system are significant, hence the correction angle must be set to a small value in order to maintain good optical performance. If the correction angle is set to a large value, a major change in the image, due to a shift of the correction optical system, must be allowed.

A second method of shifting or tilting the correction optical system is oscillating the correction optical system in a direction perpendicular to the optical axis of the objective optical system (e.g. see Patent Document 2). In this method, change in the image caused by the oscillation of the correction optical system can be controlled, but because of this configuration of the objective optical system, the optical performance drops from the original optical performance due to the oscillation of the correction optical system, which makes it difficult to increase aperture.

A third method of shifting or tilting the correction optical system is rotating the correction optical system (e.g. see Patent Document 3). In this method, a change in the image caused by the rotation of the correction optical system can be controlled, but the correction angle decreases. To increase the correction angle, the correction optical system must be further rotated, which increases the size of such optical devices as a telescope and a binocular telescope.

PRIOR ART LIST

Patent Document

Patent Document 1: Japanese Laid-Open Patent Publication No. 2003-57537(A)
Patent Document 2: Japanese Patent No. 3548539
Patent Document 3: Japanese Patent No. 5028009

SUMMARY OF THE INVENTION

Problems to be Solved by the Invention

To handle major image shake, the correction angle must be increased by significantly changing the correction optical system. However, according to conventional methods, a change in and deterioration of the image increases, as mentioned above, if the correction optical system is changed significantly.

With the foregoing in view, it is an purpose of the present invention to provide an optical device that has an image-shake preventing function which can handle significant image shake or the like, while still maintaining good optical performance.

Means to Solve the Problems

To achieve this purpose, an optical device according to an aspect of the present invention is an optical device having: an objective optical system; and an eyepiece optical system for observing an image formed by the objective optical system. The objective optical system includes, in order from an object, a first lens group, a second lens group and a third lens group, and the second lens group and the third lens group rotate together around a point on the optical axis of the objective optical system in order to correct the image.

A binocular telescope according to an aspect of the present invention is a binocular telescope including two Observation optical systems, each having: an objective optical system; an erecting optical system for erecting an image formed by the objective optical system; and an eyepiece optical system for Observing the image which is formed by the objective optical system and erected by the erecting optical system. The objective optical system includes, in order from an object, a first lens group, a second lens group, and a third lens group, and the second lens group and the third lens group rotate together around a point on the optical axis of the objective optical system in order to correct the image.

A telescope according to an aspect of the present invention is a telescope having: an objective optical system; an erecting optical system for erecting an image formed by the objective optical system; and an eyepiece optical system for Observing the image which is formed by the objective optical system and erected by the erecting optical system. The objective optical system includes, in order from an object, a first lens group, a second lens group, and a third lens group, and the second lens group and the third lens group rotate together around a point on the optical axis of the objective optical system in order to correct the image.

Advantageous Effects of the Invention

According to the aspect of the invention, an optical device that has an image-shake preventing function which can handle significant image shake or the like, while still maintaining good optical performance, can be implemented.

BRIEF DESCRIPTION OF THE DRAWINGS

FIG. 2 shows graphs showing various aberrations of the observation optical system according to Example 1;

FIG. 6 shows graphs showing various aberrations of the observation optical system according to Example 3;

DESCRIPTION OF THE EMBODIMENTS

Figure 10:
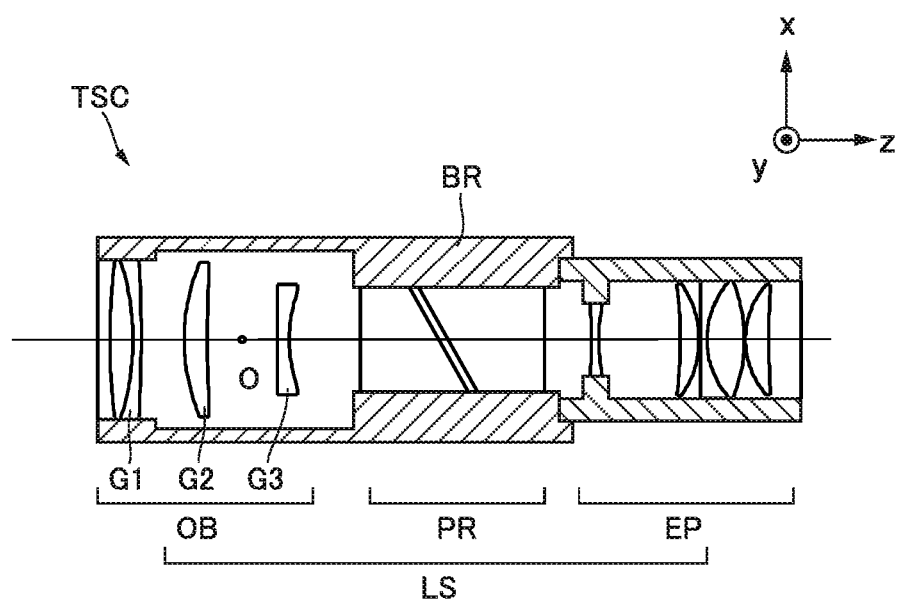
FIG. 10 is a cross-sectional view of a telescope.
Figure 11:
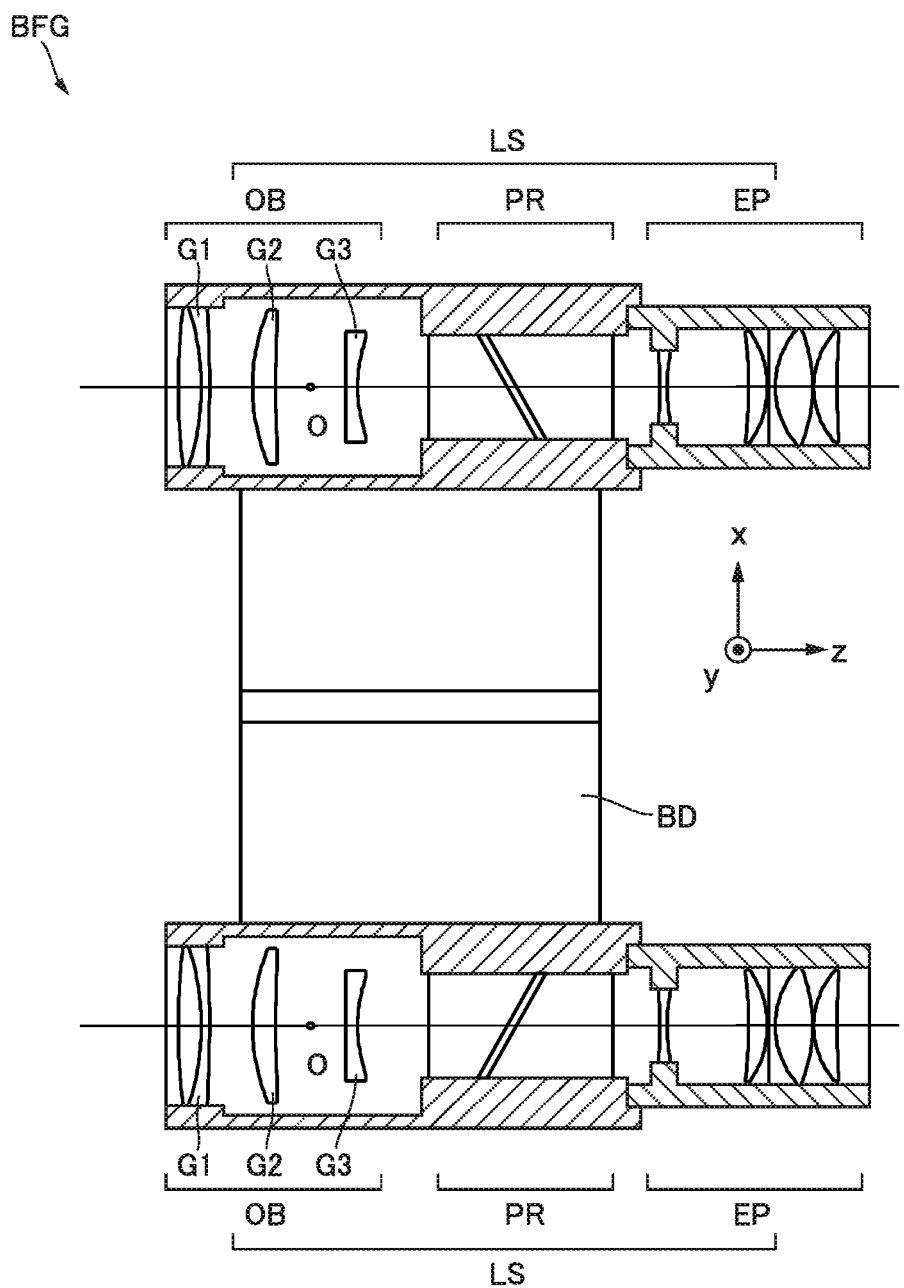
FIG. 11 is a cross-sectional view of a binocular telescope.

Preferred embodiments of the present invention will now be described with reference to the drawings. As an optical device according to Embodiment 1, FIG. 10 shows a telescope TSC. The telescope TSC shown in FIG. 10 is constituted by: an Observation optical system LS for Observing an object; and a lens barrel BR for holding the observation optical system LS. The observation optical system LS includes, in order from the object: an objective optical system OB for forming an image by collecting incident light flux; an erecting optical system PR for erecting the image formed by the objective optical system OB; and an eyepiece optical system EP for observing the image formed by the objective optical system OB. In this telescope TSC, the light from an object (not illustrated) is collected by the objective optical system OB and reaches the erecting optical system PR. The light that reached the erecting optical system PR is reflected by the erecting optical system PR for a plurality of times, and is guided to the eyepiece lens EP. Thereby the user can Observe the image of the object as an erected image via the eyepiece lens EP.

The objective optical system OB is constituted by, in order from the object: a first lens group G1 having positive or negative refractive power; a second lens group G2 having positive refractive power; and a third lens group G3 having negative refractive power. The second lens group G2 and the third lens group G3 rotate together around a point on the optical axis of the objective optical system OB, in order to correct an image formed by the objective optical system OB. For example, the second lens group G2 and the third lens group G3 are rotary-driven by a rotating device (not illustrated) constituted by a stepping motor, a rotary actuator or the like. The objective optical system OB may include a partial lens barrel for holding the second lens group G2 and the third lens group G3, so that the second lens group G2 and the third lens group G3 are rotary-driven together by moving the partial lens barrel.

Thereby a telescope TSC having an image-shake preventing function which can handle significant image shake or the like, while still maintaining good optical performance, can be implemented. Rotating together around a point (hereafter called "rotation center point O") on the optical axis of the objective optical system refers to: rotating together such that the second lens group G2 and the third lens group G3 are symmetric with respect to the rotation center point O; and rotating together such that the position of the second lens group G2 and the position of the third lens group G3 are point-symmetric with respect to the rotation center point O. In the description of this embodiment, it is assumed that the directions indicated by arrows x, y and z in FIG. 10 and other drawings are the x axis direction, the y axis direction and the z axis direction respectively.

Figure 9A:
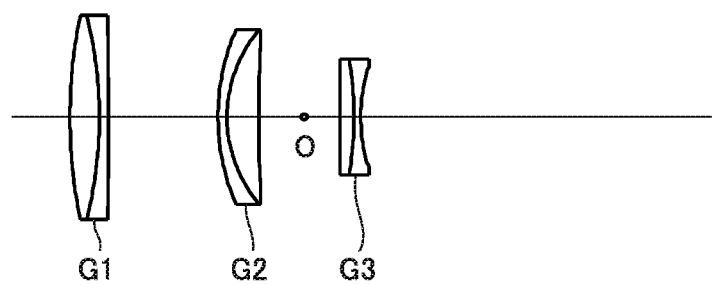
FIG. 9A and FIG. 9B are diagrams depicting rotation angles of the second lens group and the third lens group.
Figure 9B:
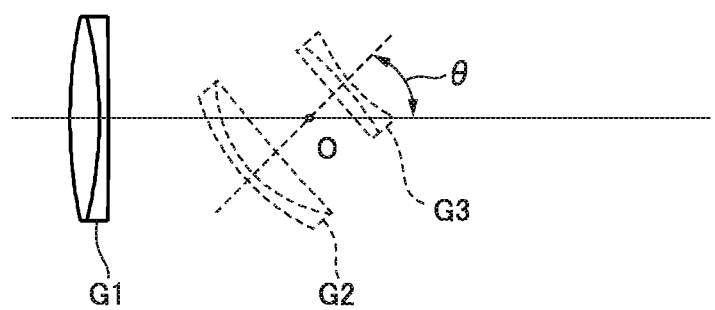

It is preferable that the second lens group G2 and the third lens group G3 rotate together within a predetermined angle range with respect to the optical axis of the first lens group G1, in order to correct an image formed by the objective optical system OB. The predetermined angle range here refers to an angle range in which high imaging characteristics to observe the image are possible with controlling aberrations well, without increasing the size of the device. If the rotation angle of the second lens group G2 and the third lens group G3 with respect to the optical axis of the first lens group G1 is θ (see FIGS. 9A and 9B), then the predetermined angle range is preferable $-10° \le \theta \le 10°$.

In the objective optical system OB, it is preferable that the following conditional expression (1) is satisfied.

$$0.00 < |(Dm/f1) \times \theta m| < 0.07 \qquad (1)$$

where f1: focal length of the first lens group G1

Dm: effective diameter of the first lens group G1

θm: maximum rotation angle (unit: rad) of the second lens group G2 and the third lens group G3

The conditional expression (1) is a conditional expression on a focal length and effective diameter of the first lens group G1 constituting the objective optical system OB of the telescope TSC, and the maximum rotation angle of the second lens group G2 and the third lens group G3. The effective diameter Dm of the first lens group G1 corresponds to the entrance pupil diameter, that is an aperture (effective diameter), of the objective optical system OB. If the upper limit value of the conditional expression (1) is exceeded, the objective optical system becomes too large. Moreover, the rotation angle of the second lens group G2 and the third lens group G3 becomes too large, and the driving mechanism becomes complicated. For example, if the F value of the objective optical system of the telescope is 2.5 or more, and the second lens group G2 and the third lens group G3 can be driven at a rotation angle that is 10° (0.17 [rad]), the upper limit value of the conditional expression (1) is about 0.07. In terms of the optical performance, if the upper limit value of the conditional expression (1) is exceeded, the change in the image caused by the rotation of the second lens group G2 and the third lens group G3 increases, and observing a good image becomes difficult. On the other hand, if the lower limit value of the conditional expression (1) is not reached, that is, if the value of the conditional expression (1) is 0 (zero), image-shake prevention cannot be performed, even if image shake or the like is generated. In other words, image-shake prevention can be performed when image shake or the like is generated if the conditional expression (1) has a value greater than 0 (zero). Therefore, if the telescope TSC of this embodiment satisfies the conditional expression (1), a telescope (or binocular telescope) having an image-shake preventing function which can handle significant image shake or the like, while still maintaining good optical performance, can be implemented. Further, the telescope can be downsized, and a good image can be observed, with minimizing changes in the image caused by the rotation of the second lens group G2 and the third lens group G3.

To demonstrate the effect of this embodiment with certainty, it is preferable that the upper limit value of the conditional expression (1) is 0.03. Then the telescope can be downsized even more, and a good image can be observed, with minimizing changes in the image caused by the rotation of the second lens group G2 and the third lens group G3.

In the objective optical system OB, it is preferable that the following conditional expression (2) and conditional expression (3) are satisfied.

$$0.0 < |fv1/f| < 1.2 \quad (2)$$

$$0.0 < |fv2/f| < 1.2 \quad (3)$$

where
f: focal length of the objective optical system OB
fv1: focal length of the second lens group G2
fv2: focal length of the third lens group G3

The conditional expression (2) and the conditional expression (3) specify appropriate ranges of the focal lengths of the second lens group G2 and the third lens group G3. If the lower limit value of the conditional expression (2) is not reached, or if the lower limit value of the conditional expression (3) is not reached, the correction angle becomes insufficient to handle significant image shake or the like, and a good image cannot be observed. On the other hand, if the upper limit value of the conditional expression (2) is exceeded, or if the upper limit value of the conditional expression (3) is exceeded, the changes in the image caused by the rotation of the second lens group G2 and the third lens group G3 increases, and a good image cannot be observed. Therefore if the telescope TSC of this embodiment satisfies the conditional expression (2) and the conditional expression (3), a telescope having an image-shake preventing function, which can handle significant image shake or the like, while still maintaining good optical performance, can be implemented.

To demonstrate the effect of this embodiment with certainty, it is preferable that the upper limit value of the conditional expression (2) is 0.7. Then a good image can be observed even if significant image shake or the like is generated. Furthermore, to demonstrate the effect of this embodiment with certainty, it is preferable that the lower limit value of the conditional expression (2) is 0.4. Then a good image can be observed, with minimizing changes in the image caused by the rotation of the second lens group G2 and the third lens group G3.

To demonstrate the effect of this embodiment with certainty, it is preferable that the upper limit value of the conditional expression (3) is 0.4. Then a good image can be observed even if significant image shake or the like is generated. Furthermore, to demonstrate the effect of this embodiment with certainty, it is preferable that the lower limit value of the conditional expression (3) is 0.2. Then a good image can be observed, with minimizing changes in the image caused by the rotation of the second lens group G2 and the third lens group G3.

In the objective optical system OB, it is preferable that the following conditional expression (4) is satisfied.

$$0.5 < |\beta 12| < 1.5 \quad (4)$$

where
β12: imaging magnification of a lens system constituted by the second lens group G2 and the third lens group G3 with respect to an object at infinity (imaging magnification with respect to an object at infinity in the objective optical system)

The conditional expression (4) satisfies an appropriate range of the imaging magnification of the lens system constituted by the second lens group G2 and the third lens group G3 (hereafter also called "image-shake preventing optical system"). If the image-shake preventing optical system satisfies the condition of the conditional expression (4), both the optical performance of the image-shake preventing optical system in a non-rotating state (normal state) and the optical performance of the image-shake preventing optical system in a rotating state (image-shake preventing state) can be maintained well.

To demonstrate the effect of this embodiment with certainty, it is preferable that the upper limit value of the conditional expression (4) is 1.2. Then the optical performance of the image-shake preventing optical system in the rotating state (image-shake preventing state) can be improved even more. Furthermore, to demonstrate the effect of this embodiment with certainty, it is preferable that the lower limit value of the conditional expression (4) is 0.8. Then the optical performance of the image-shake preventing optical system in the non-rotating state (normal state) can be improved even more.

It is preferable that the second lens group G2 and the third lens group G3 are each constituted by a cemented lens. Then aberrations can be corrected well.

It is preferable that the second lens group G2 and the third lens group G3 rotate together around a point on the optical axis between the second lens group G2 and the third lens group G3. Then, when the second lens group G2 and the third lens group G3 rotate, the magnitude of torque that acts on the second lens group G2 and that acts on the third lens group G3 can be equalized, and the second lens group G2 and the third lens group G3 can rotate together smoothly.

The position of the rotation center point O may be set in a position where changes in the optical performance caused by the rotation of the image-shake preventing optical system are minor. For example, the position of the rotation center point O is set on the optical path between the first lens group G1 and the erecting optical system PR. The position of the rotation center point O may also be set based on the magnitude of the torque that acts on the second lens group G2 and the third lens group G3. For example, it is assumed that the second lens group G2 according to the later mentioned Example 1 has a ϕ31 mm outer diameter, and a 3.25 g/cm$^3$ specific gravity. It is also assumed that the third lens group G3 according to the later mentioned Example 1 has a ϕ22 mm outer diameter and a 3.25 g/cm$^3$ specific gravity. In this case, the mass of the second lens group G2 is 9.9 g, and the mass of the third lens group G3 is 4.6 g. To smoothly rotate the image-shake preventing optical system as one unit, it is preferable that the magnitude of torque that acts on the second lens group G2 and that acts on the third lens group G3 are equal. In the case of the above example, the position of the rotation center point O, with which the magnitude of torque that acts on the second lens group G2 and that acts on the third lens group G3 are equal, is a position that is 4.8 mm from the surface closest to the object in the second lens group G2 and 10.2 mm from the surface closest to the eye point in the third lens group G3.

It is preferable that the image-shake preventing optical system can rotate in various directions around a point (rotation center point O) on the optical axis located between the second lens group G2 and the third lens group G3. In the case of a later mentioned hand held observation optical system LS, such as a binocular telescope BFG, correction of image shake in the pitch direction (rotation direction around an axis parallel with the x axis) is critical, hence the image-shake preventing optical system may be configured such that only rotation around the axis parallel with the x axis is possible. Further, in the case of a dual axis rotation device that includes a rotation mechanism that allows rotation in the pitch direction and the yaw direction (rotation direction around the axis parallel with the y axis), the rotation axis in the yaw direction and the rotation axis in the pitch direction need not always cross at one point on the optical axis.

It is preferable that the first lens group G1 is fixed to the lens barrel BR. Then even if the second lens group G2 and the third lens group G3 are rotary-driven, the change in the first lens group G1 is minimized, therefore good optical performance can be maintained.

Embodiment 2 of the present invention will be described next. As an optical device according to Embodiment 2, FIG. 10 shows a binocular telescope BFG. The binocular telescope BFG shown in FIG. 10 is constituted by: two observation optical systems LS and LS for observing an object; and a mirror body BD for holding the two observation optical systems LS and LS which are horizontally disposed side-by-side. Each of the two observation optical systems LS and LS includes: an objective optical system OB for forming an image by collecting incident light flux; an erecting optical system PR for erecting the image formed by the objective optical system OB; and an eyepiece optical system EP for observing the image formed by the objective optical system OB. In this binocular telescope BFG, the light from an object (not illustrated) is collected by the objective optical system OB, and reaches the erecting optical system PR. The light reaching the erecting optical system PR is reflected by the erecting optical system PR for a plurality of times, and is guided to the eyepiece lens EP. Thereby the user can observe the image of the object as an erected image via the eyepiece lens EP.

The observation optical system LS of Embodiment 2 has the same configuration as the observation optical system LS of Embodiment 1, hence each composing element of the observation optical system LS is denoted with a same reference symbol as Embodiment 1, and detailed description is omitted. According to Embodiment 2, just like Embodiment 1, a binocular telescope BFG having an image-shake preventing function, which can handle significant image shake or the like, while still maintaining good optical performance, can be implemented.

EXAMPLES

Example 1

Figure 1A:
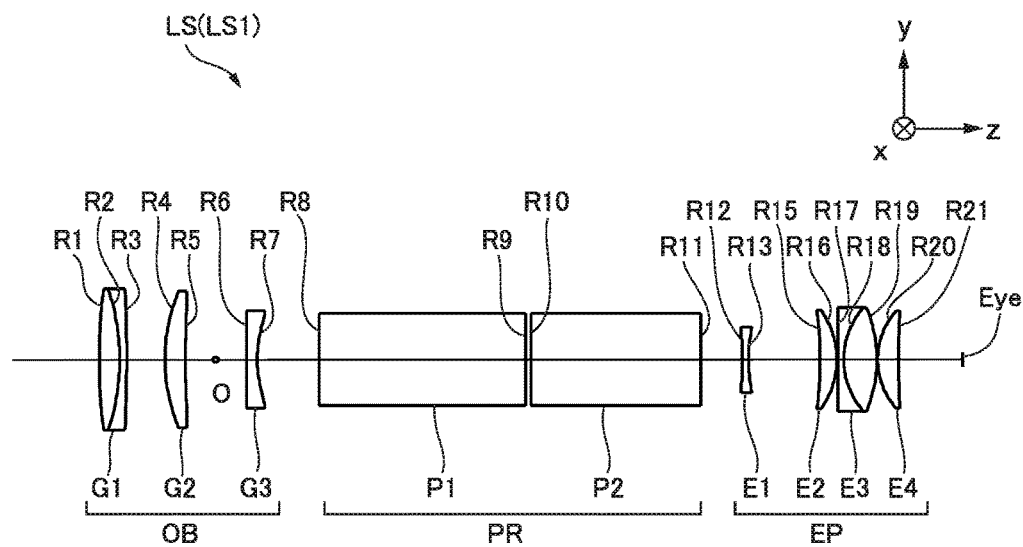
FIG. 1A is a diagram depicting a lens configuration of an observation optical system according to Example 1.

Examples of the present invention will now be described with reference to the accompanying drawings. First, Example 1 according to the present invention will be described with reference to FIGS. 1, 2 and Table 1. FIG. 1A shows Example 1 (aperture: 32) of an observation optical system LS (LS1) that is used for a telescope TSC or a binocular telescope BFG. The observation optical system LS1 according to Example 1 has, in order from an object: an objective optical system OB; an erecting optical system PR for erecting an image formed by the objective optical system OB; and an eyepiece optical system EP for observing an image formed by the objective optical system OB.

The objective optical system OB is constituted by, in order from an object: a first lens group G1 having positive refractive power; a second lens group G2 having positive refractive power; and a third lens group G3 having negative refractive power. The first lens group G1 is constituted by a cemented positive lens of a positive lens and a negative lens. The second lens group G2 is constituted by one positive lens. The third lens group G3 is constituted by one negative lens.

Figure 1B:
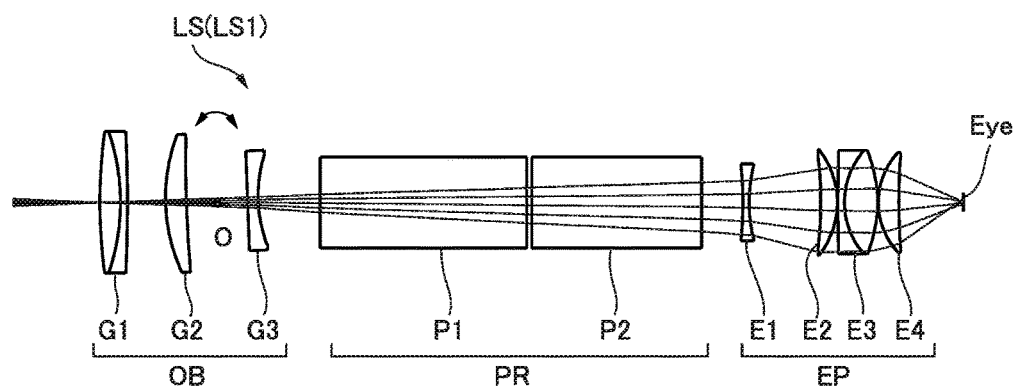
FIG. 1B is an optical path diagram depicting a change in principal rays during image shake correction.

The second lens group G2 and the third lens group G3, which constitute an image-shake preventing optical system, rotate together around a rotation center point O (around an axis parallel with the x axis), so as to correct an image generated by image shake or the like. The rotation center point O is disposed on the optical axis between a surface closest to the object in the second lens group G2 and a surface closest to the eye point in the third lens group G3. FIG. 1B shows the changes in principal rays at 0% (on the axis) and 50% and 100% (maximum angle of view) when image shake is corrected (when the image-shake preventing optical system is rotated).

The erecting optical system PR is constituted by an erecting prism using an auxiliary prism P1 and a roof prism P2. The eyepiece optical system EP is constituted by a first eyepiece lens E1 which is a single lens, a second eyepiece lens E2 which is a single lens, a third eyepiece lens E3 which is a cemented lens, and a fourth eyepiece lens E4 which is a single lens. To simplify the description, the auxiliary prism P1 and the roof prism P2 are drawn only as outlines in FIG. 1.

Table 1 to Table 4 shown below list each data on the observation optical systems LS according to Examples 1 to 4. In [Spec Data] in each table, f denotes the focal length of the objective optical system OB, f1 denotes the focal length of the first lens group G1, fv1 denotes the focal length of the second lens group G2, and fv2 denotes the focal length of the third lens group G3. In [Spec Data], β1 denotes the imaging magnification of the second lens group G2 with respect to an object at infinity. β2 denotes the imaging magnification of the third lens group G3 with respect to an object at infinity, β12 denotes the imaging magnification of the image-shake preventing optical system with respect to an object at infinity, and Od denotes the distance from the surface closest to the object in the second lens group G2 to the rotation center point O.

In [Lens Data], the surface number indicates the number of each surface counted from the object side, R denotes the radius curvature of each lens surface, D denotes the distance of each lens surface, nd denotes the refractive index at d-line (wavelength: λ=587.6 nm), and vd denotes the Abbe number at d-line (wavelength: λ=587.6 nm). The radius of curvature "∞" indicates a plane, and the refractive index of air nd=1.0000 is omitted. In [Rotational Displacement Data], Δy(θ) denotes the displacement of the vertex of each surface in the y axis direction when the optical axis of the image-shake preventing optical system is rotated from the optical axis of the objective optical system OB by θ, and Δz(θ) denotes the displacement of the vertex of each surface in the z axis direction when the optical axis of the image-shake preventing optical system is rotated from the optical axis of the objective optical system OB by θ. In [Conditional Expression Correspondence Value], a correspondence value of each conditional expression is shown.

In all the data values, "mm" is normally used as the unit of focal length f, radius of curvature R and for other lengths, but unit is not limited to "mm" since an equivalent optical performance is obtained even if an optical system is proportionally expanded or proportionally reduced. For the data values of the later mentioned Examples 2 to 4 as well, the same symbols as in this example are used.

Table 1 shows each data of Example 1. The radius of curvature R of Surface 1 to Surface 21 in Table 1 correspond to the reference symbols R1 to R21 related to Surface 1 to Surface 21 in FIG. 1 respectively. Surface 14 is a virtual surface and is omitted in FIG. 1. The surface distance from Surface 22 is a distance from the last lens surface (Surface 21) to the eye point Eye (eye relief).

TABLE 1

[Spec Data]

Aperture (Dm): 32
Magnification: 12
Real field of view (unit: °): 5
f = 160
f1 = 177.7778
fv1 = 78.50461
fv2 = −51.5842
β1 = 0.321429
β2 = 2.8
β12 = 0.9
Od = 11.25

[Lens Data]

| Surface number | R | D | nd | vd |
|---|---|---|---|---|
| 1 | 123.8952 | 5 | 1.58913 | 61.25 |
| 2 | −52.4236 | 1.7 | 1.63980 | 34.57 |
| 3 | −344.505 | 9.200012 | | |
| 4 | 42.01402 | 5 | 1.62041 | 60.34 |
| 5 | 291.8954 | 15 | | |
| 6 | −5000 | 2.5 | 1.62041 | 60.34 |
| 7 | 32.21564 | 15 | | |
| 8 | ∞ | 50 | 1.56883 | 56.04 |
| 9 | ∞ | 1.2 | | |
| 10 | ∞ | 41 | 1.56883 | 56.04 |
| 11 | ∞ | 10 | | |
| 12 | −90 | 1.5 | 1.51680 | 64.20 |
| 13 | 36.45254 | 9.148863 | | |
| 14 | ∞ | 8.312495 | | |
| 15 | −90 | 4 | 1.51680 | 64.20 |
| 16 | −20.3404 | 0.2 | | |
| 17 | 2496.21 | 1.5 | 1.84666 | 23.78 |
| 18 | 18.6 | 8 | 1.69680 | 55.46 |
| 19 | −31.9715 | 0.2 | | |
| 20 | 17.5 | 5 | 1.62041 | 60.34 |
| 21 | 176.9582 | 0 | | |
| 22 | — | 15.56361 | | |

[Rotational Displacement Data]

| Surface number | Δy (4°) | Δz (4°) |
|---|---|---|
| 4 | −0.78476 | 0.027404 |
| 5 | −0.43598 | 0.015225 |
| 6 | 0.610369 | −0.02131 |
| 7 | 0.78476 | −0.0274 |

[Conditional Expression Correspondence Value]

Conditional expression (1) |(Dm/f1) × θm| = 0.012566
Conditional expression (2) |fv1/f| = 0.4907
Conditional expression (3) |fv2/f| = 0.3224
Conditional expression (4) |β12| = 0.9

As a result, this example satisfies all the conditional expressions (1) to (4).

FIG. 2 shows graphs showing lateral aberrations (unit: ′) at 0% (on the axis), and 50% (angle of view: ±1.25°) when the image-shake preventing optical system of Example 1 is rotated by 0°, 2° and 4°. If the rotation angle θ of the image-shake preventing optical system is 2° (0.035 [rad]), the image-shake preventing correction angle on the object side corresponds to 0.64°. If the rotation angle θ of the image-shake preventing optical system is 4° (0.070 [rad]), the image-shake preventing correction angle on the object side corresponds to 1.07°. As each graph showing aberrations clarifies, various aberrations are corrected well, and excellent imaging performance is demonstrated in Example 1. As a result, excellent optical performance can be guaranteed for a telescope TSC or a binocular telescope BFG by installing the observation optical system LS1 of Example 1.

Example 2

Figure 3A:
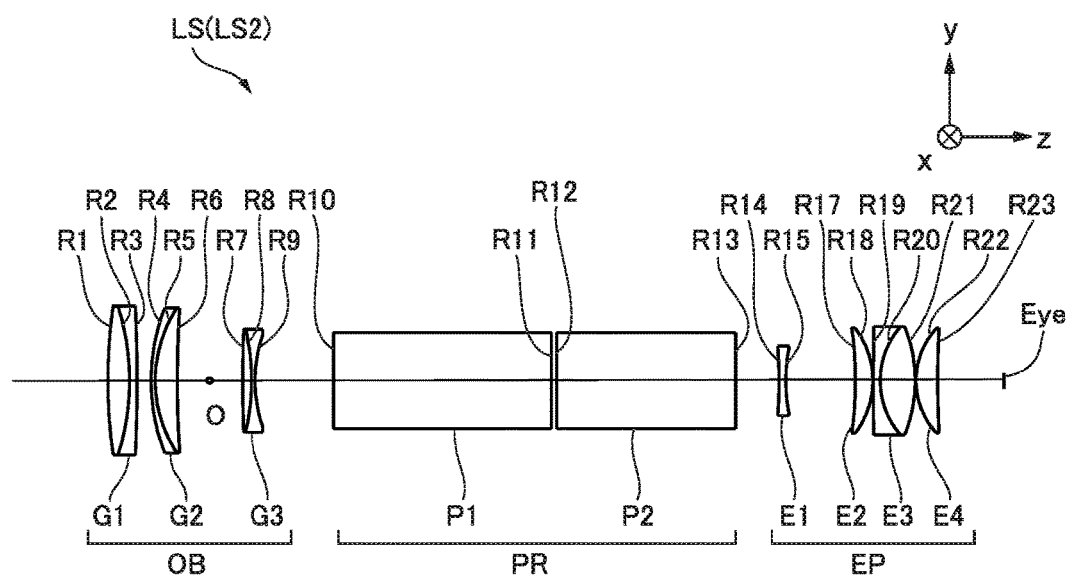
FIG. 3A is a diagram depicting a lens configuration of an observation optical system according to Example 2.

Example 2 according to the present invention will now be described with reference to FIGS. 3, 4 and Table 2. FIG. 3A shows Example 2 (aperture: 32) of an observation optical system LS (LS2) that is used for a telescope TSC or a binocular telescope BFG. The observation optical system LS2 according to Example 2 has, in order from an object: an objective optical system OB; an erecting optical system PR for erecting an image formed by the objective optical system OB; and an eyepiece optical system EP for observing an image formed by the objective optical system OB.

The objective optical system OB is constituted by, in order from an object: a first lens group G1 having positive refractive power; a second lens group G2 having positive refractive power; and a third lens group G3 having negative refractive power. The first lens group G1 is constituted by a cemented positive lens of a positive lens and a negative lens. The second lens group G2 is constituted by a cemented positive lens of a negative lens and a positive lens. The third lens group G3 is constituted by a cemented negative lens of a positive lens and a negative lens.

Figure 3B:
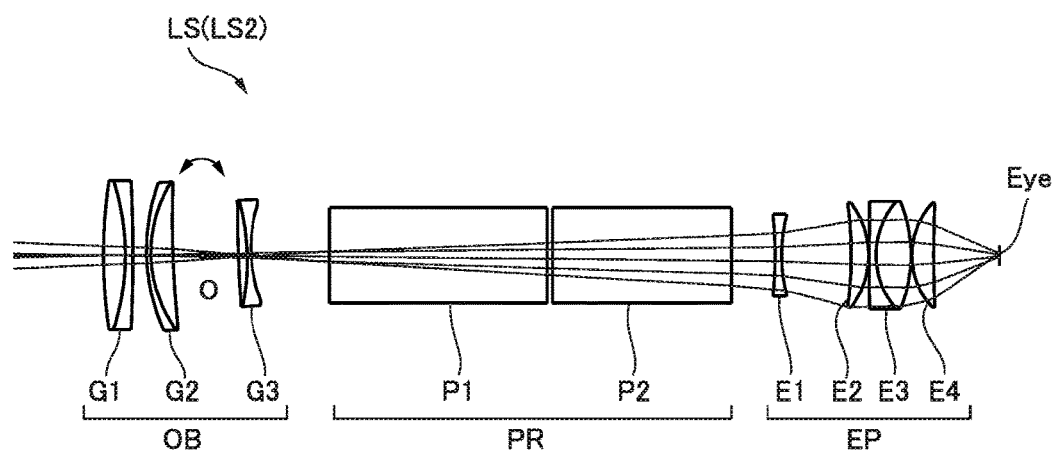
FIG. 3B is an optical path diagram depicting a change in principal rays during image shake correction.

The second lens group G2 and the third lens group G3, which constitute an image-shake preventing optical system, rotate together around a rotation center point O (around an axis parallel with the x axis), so as to correct an image generated by image shake or the like. The rotation center point O is disposed on the optical axis between a surface closest to the object in the second lens group G2 and a surface closest to the eye point in the third lens group G3. FIG. 3B shows the changes in principal rays at 0% (on the axis) and 50% and 100% (maximum angle of view) when image shake is corrected (when the image-shake preventing optical system is rotated).

The erecting optical system PR is constituted by an erecting prism using an auxiliary prism P1 and a roof prism P2. The eyepiece optical system EP is constituted by a first eyepiece lens E1 which is a single lens, a second eyepiece lens E2 which is a single lens, a third eyepiece lens E3 which is a cemented lens, and a fourth eyepiece lens E4 which is a single lens. To simplify the description, the auxiliary prism P1 and the roof prism P2 are drawn only as outlines in FIG. 3.

Table 2 shows each data of Example 2. The radius of curvature R of Surface 1 to Surface 23 in Table 2 correspond to the reference symbols R1 to R23 related to Surface 1 to Surface 23 in FIG. 3 respectively. Surface 16 is a virtual surface and is omitted in FIG. 3. The surface distance from Surface 24 is a distance from the last lens surface (Surface 23) to the eye point Eye (eye relief).

TABLE 2

[Spec Data]

Aperture (Dm): 32
Magnification: 12
Real field of view (unit: °): 5
f = 159.9954
f1 = 177.7766
fv1 = 81.40568
fv2 = −52.6745
β1 = 0.321429
β2 = 2.8
β12 = 0.900002
Od = 12

TABLE 2-continued

[Lens Data]

| Surface number | R | D | nd | vd |
|---|---|---|---|---|
| 1 | 117.7685 | 5 | 1.58913 | 61.25 |
| 2 | −54.8811 | 1.7 | 1.63980 | 34.57 |
| 3 | −409.448 | 3.20003 | | |
| 4 | 45.11286 | 1 | 1.64769 | 33.84 |
| 5 | 30.2561 | 5 | 1.67000 | 57.35 |
| 6 | 226.0765 | 15 | | |
| 7 | 334.1271 | 2 | 1.64769 | 33.84 |
| 8 | −52.278 | 1 | 1.67000 | 57.35 |
| 9 | 32.58083 | 18 | | |
| 10 | ∞ | 50 | 1.56883 | 56.04 |
| 11 | ∞ | 1.2 | | |
| 12 | ∞ | 41 | 1.56883 | 56.04 |
| 13 | ∞ | 10 | | |
| 14 | −90 | 1.5 | 1.51680 | 64.20 |
| 15 | 36.45254 | 7.958721 | | |
| 16 | ∞ | 8.11424 | | |
| 17 | −90 | 4 | 1.51680 | 64.20 |
| 18 | −19.63 | 0.2 | | |
| 19 | 3147.821 | 1.5 | 1.84666 | 23.78 |
| 20 | 18.64506 | 8 | 1.69680 | 55.46 |
| 21 | −32.7346 | 0.2 | | |
| 22 | 17.5 | 5 | 1.62041 | 60.34 |
| 23 | 237.0839 | 0 | | |
| 24 | — | 15.12728 | | |

[Rotational Displacement Data]

| Surface number | Δy (5.5°) | Δz (5.5°) |
|---|---|---|
| 4 | −1.1501 | −11.9448 |
| 5 | −1.0543 | −10.9494 |
| 6 | −0.5751 | −5.9724 |
| 7 | 0.8626 | 8.9586 |
| 8 | 1.0543 | 10.9494 |
| 9 | 1.1501 | 11.9448 |

[Conditional Expression Correspondence Value]

Conditional expression (1) |(Dm/f1) × θm| = 0.017279
Conditional expression (2) |fv1/f| = 0.5088
Conditional expression (3) |fv2/f| = 0.3292
Conditional expression (4) |β12| = 0.900002

As a result, this example satisfies all the conditional expressions (1) to (4).

Figure 4:
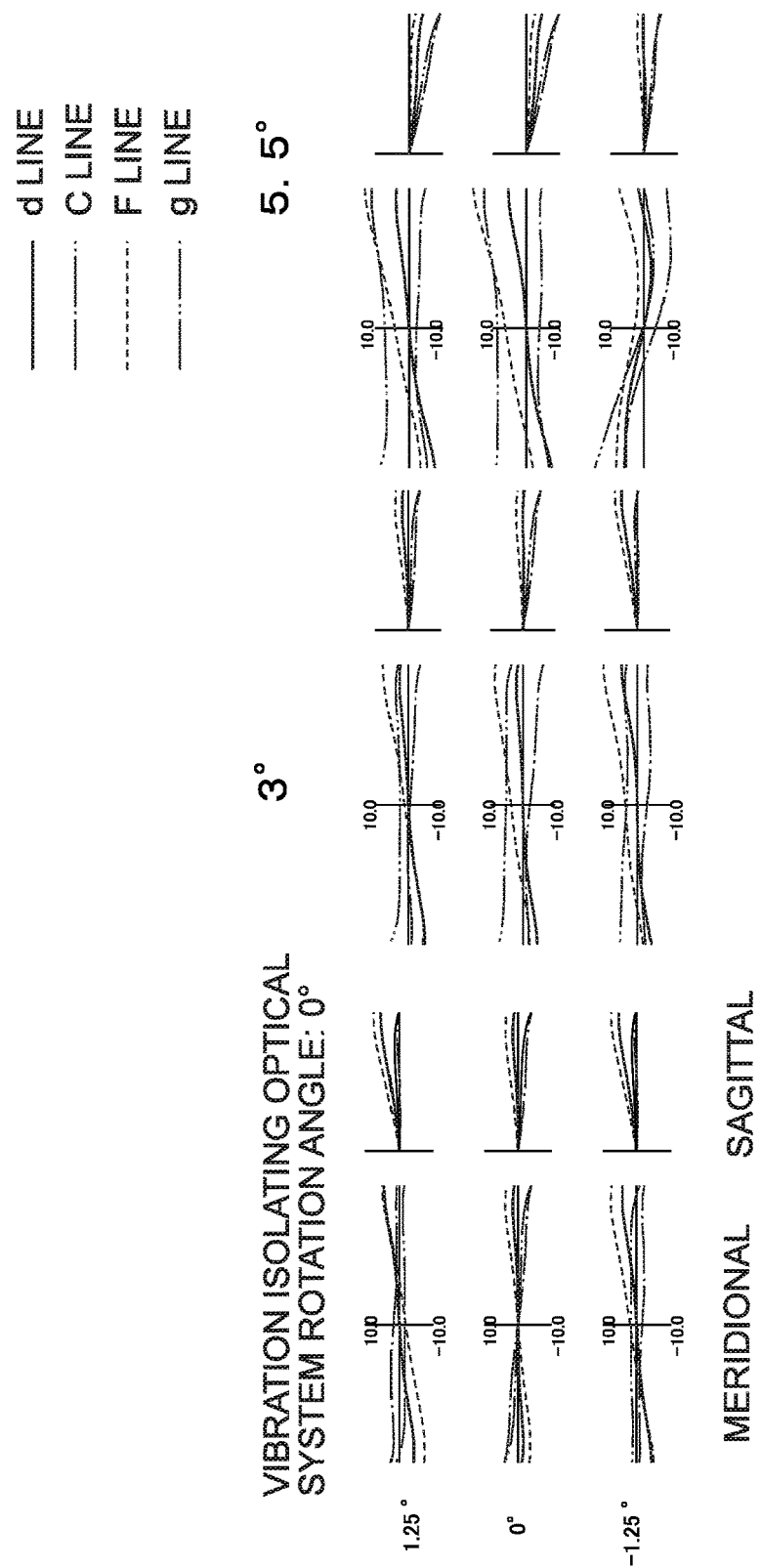
FIG. 4 shows graphs showing various aberrations of the observation optical system according to Example 2.

FIG. 4 shows graphs showing lateral aberrations (unit: ') at 0% (on the axis), and 50% (angle of view: ±1.25°) when the image-shake preventing optical system of Example 2 is rotated at 0°, 3° and 5.5°. If the rotation angle θ of the image-shake preventing optical system is 3° (0.052 [rad]), the image-shake preventing correction angle on the object side corresponds to 0.42°. If the rotation angle θ of the image-shake preventing optical system is 5.5° (0.096 [rad]), the image-shake preventing correction angle on the object side corresponds to 1.03°. As each graph showing aberrations clarifies, various aberrations are corrected well, and excellent imaging performance is demonstrated in Example 2. As a result, excellent optical performance can be guaranteed for a telescope TSC or a binocular telescope BFG by installing the observation optical system LS2 of Example 2.

Example 3

Figure 5A:
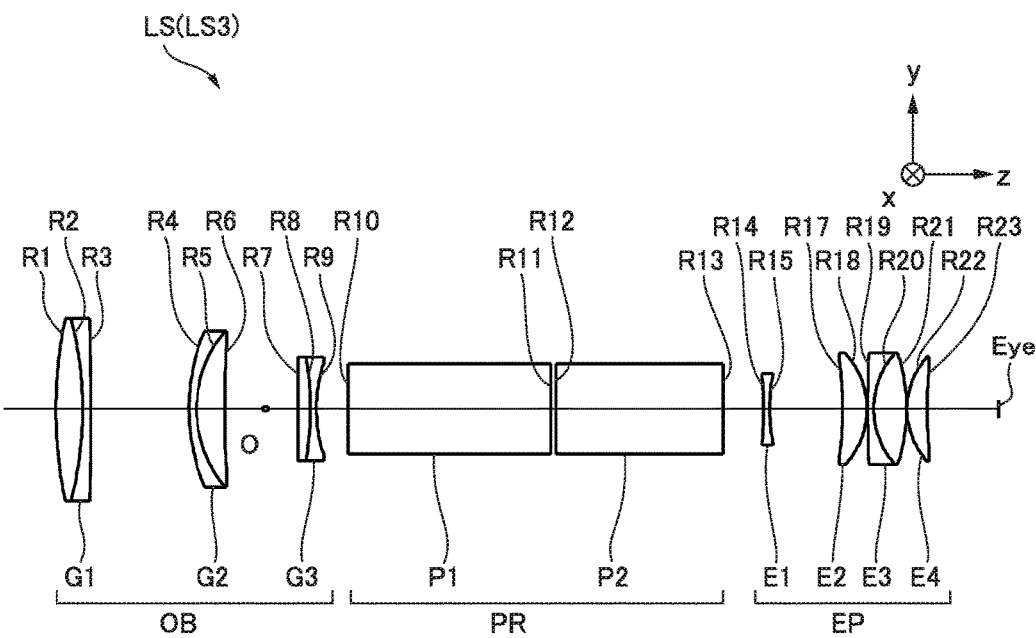
FIG. 5A is a diagram depicting a lens configuration of an observation optical system according to Example 3.

Example 3 according to the present invention will now be described with reference to FIGS. 5, 6 and Table 3. FIG. 5A shows Example 3 (aperture: 42) of an observation optical system LS (LS3) that is used for a telescope TSC or a binocular telescope BFG. The observation optical system LS3 according to Example 3 has, in order from an object: an objective optical system OB; an erecting optical system PR for erecting an image formed by the objective optical system OB; and an eyepiece optical system EP for observing an image formed by the objective optical system OB.

The objective optical system OB is constituted by, in order from an object: a first lens group G1 having positive refractive power; a second lens group G2 having positive refractive power; and a third lens group G3 having negative refractive power. The first lens group G1 is constituted by a cemented positive lens of a positive lens and a negative lens. The second lens group G2 is constituted by a cemented positive lens of a negative lens and a positive lens. The third lens group G3 is constituted by a cemented negative lens of a positive lens and a negative lens.

Figure 5B:
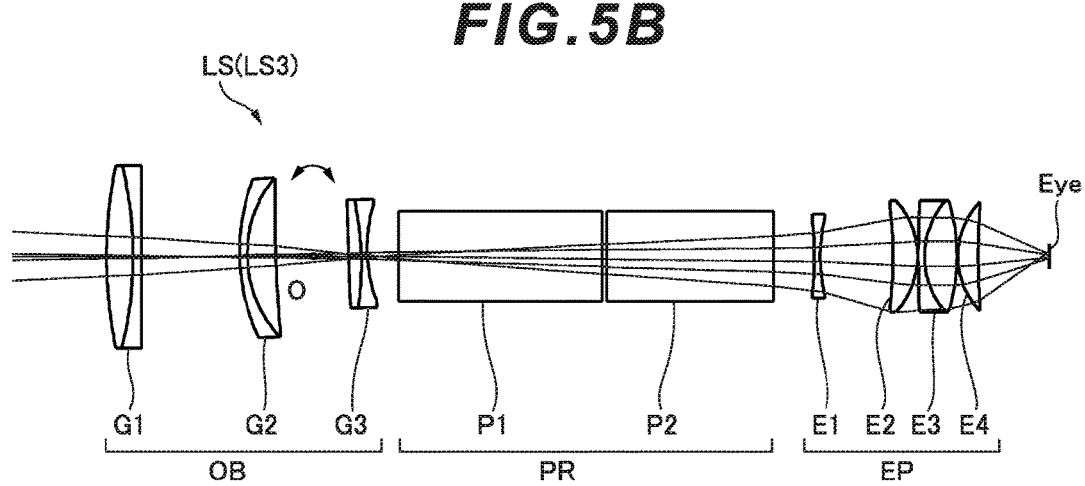
FIG. 5B is an optical path diagram depicting a change in principal rays during image shake correction.

The second lens group G2 and the third lens group G3, which constitute an image-shake preventing optical system, rotate together around a rotation center point O (around an axis parallel with the x axis), so as to correct an image generated by image shake or the like. The rotation center point O is disposed on the optical axis between a surface closest to the object in the second lens group G2 and a surface closest to the eye point in the third lens group G3. FIG. 5B shows the changes in principal rays at 0% (on the axis) and 50% and 100% (maximum angle of view) when image shake is corrected (when the image-shake preventing optical system is rotated).

The erecting optical system PR is constituted by an erecting prism using an auxiliary prism P1 and a roof prism P2. The eyepiece optical system EP is constituted by a first eyepiece lens E1 which is a single lens, a second eyepiece lens E2 which is a single lens, a third eyepiece lens E3 which is a cemented lens, and a fourth eyepiece lens E4 which is a single lens. To simplify the description, the auxiliary prism P1 and the roof prism P2 are drawn only as outlines in FIG. 5.

Table 3 shows each data of Example 3. The radius of curvature R of Surface 1 to Surface 23 in Table 3 correspond to the reference symbols R1 to R23 related to Surface 1 to Surface 23 in FIG. 5 respectively. Surface 16 is a virtual surface and is omitted in FIG. 5. The surface distance from Surface 24 is a distance from the last lens surface (Surface 23) to the eye point Eye (eye relief).

TABLE 3

[Spec Data]

Aperture (Dm): 42
Magnification: 12
Real field of view (unit: °): 5
f = 180
f1 = 200
fv1 = 96.47317
fv2 = −57.021
β1 = 0.360005
β2 = 2.5
β12 = 0.900013
Od = 15.76046

[Lens Data]

| Surface number | R | D | nd | vd |
|---|---|---|---|---|
| 1 | 111.3414 | 6.5 | 1.58913 | 61.25 |
| 2 | −94.7215 | 2 | 1.63980 | 34.57 |
| 3 | −2680 | 24.33875 | | |
| 4 | 47.69163 | 2 | 1.66755 | 41.93 |
| 5 | 29.61308 | 7 | 1.61800 | 63.34 |
| 6 | 289.2566 | 18.02091 | | |
| 7 | −2184.3 | 3 | 1.62004 | 36.30 |
| 8 | −87.1396 | 1.5 | 1.61800 | 63.34 |
| 9 | 35.7976 | 7.6517 | | |

TABLE 3-continued

| 10 | ∞ | 50 | 1.56883 | 56.04 |
|---|---|---|---|---|
| 11 | ∞ | 1.2 | | |
| 12 | ∞ | 41 | 1.56883 | 56.04 |
| 13 | ∞ | 10 | | |
| 14 | −90 | 1.5 | 1.51680 | 64.20 |
| 15 | 41.78046 | 8.99949 | | |
| 16 | ∞ | 9.087886 | | |
| 17 | −90 | 6 | 1.51680 | 64.20 |
| 18 | −20.0545 | 0.2 | | |
| 19 | 369.963 | 1.5 | 1.84666 | 23.78 |
| 20 | 20.49168 | 8 | 1.69680 | 55.46 |
| 21 | −44.9397 | 0.2 | | |
| 22 | 18.93301 | 5 | 1.62041 | 60.34 |
| 23 | 150 | 0 | | |
| 24 | — | 17.46637 | | |

[Rotational Displacement Data]

| Surface number | Δy (4°) | Δz (4°) |
|---|---|---|
| 4 | −1.0994 | 0.0384 |
| 5 | −0.9599 | 0.0335 |
| 6 | −0.4716 | 0.0165 |
| 7 | 0.7855 | −0.0274 |
| 8 | 0.9948 | −0.0347 |
| 9 | 1.0994 | −0.0384 |

[Conditional Expression Correspondence Value]

Conditional expression (1) |(Dm/f1) × θm| = 0.014661
Conditional expression (2) |fv1/f| = 0.5360
Conditional expression (3) |fv2/f| = 0.3168
Conditional expression (4) |β12| = 0.900013

As a result, this example satisfies all the conditional expressions (1) to (4).

FIG. 6 shows graphs showing lateral aberrations (unit: ') at 0% (on the axis), and 50% (angle of view: ±1.25°) when the image-shake preventing optical system of Example 3 is rotated by 0°, 2° and 4°. If the rotation angle θ of the image-shake preventing optical system is 2° (0.035 [rad]), the image-shake preventing correction angle on the object side corresponds to 0.63°. If the rotation angle θ of the image-shake preventing optical system is 4° (0.070 [rad]), the image-shake preventing correction angle on the object side corresponds to 1.05°. As each graph showing aberrations clarifies, various aberrations are corrected well, and excellent imaging performance is demonstrated in Example 3. As a result, excellent optical performance can be guaranteed for a telescope TSC or a binocular telescope BFG by installing the observation optical system LS3 of Example 3.

Example 4

Figure 7A:
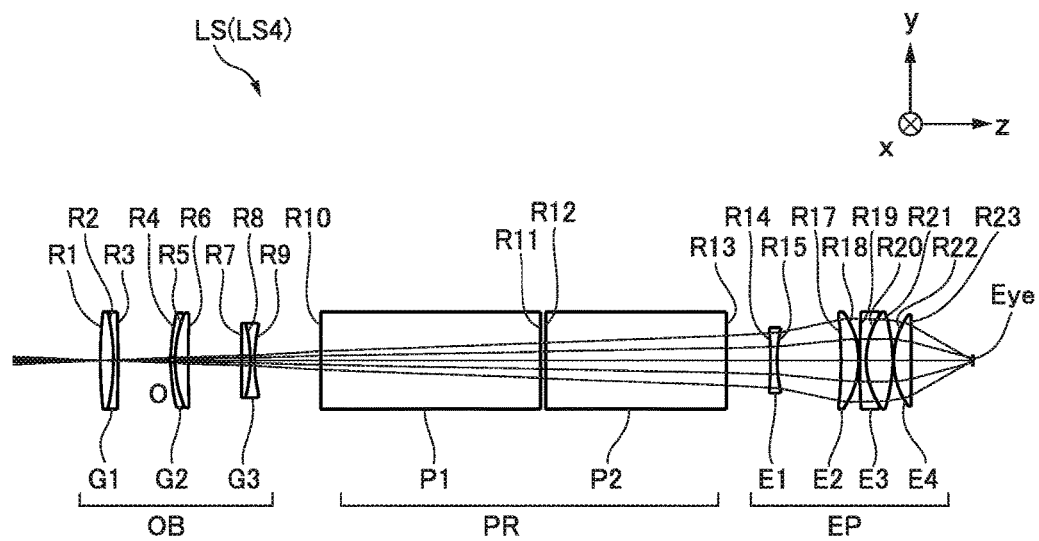
FIG. 7A is a diagram depicting a lens configuration of an observation optical system according to Example 4.

Example 4 according to the present invention will now be described with reference to FIGS. 7, 8 and Table 4. FIG. 7A shows Example 4 (aperture: 20) of an observation optical system LS (LS4) that is used for a telescope TSC or a binocular telescope BFG. The observation optical system LS4 according to Example 4 has, in order from an object: an objective optical system OB; an erecting optical system PR for erecting an image formed by the objective optical system OB; and an eyepiece optical system EP for observing an image formed by the objective optical system OB.

The objective optical system OB is constituted by, in order from an object: a first lens group G1 having positive refractive power; a second lens group G2 having positive refractive power; and a third lens group G3 having negative refractive power. The first lens group G1 is constituted by a cemented positive lens of a positive lens and a negative lens. The second lens group G2 is constituted by a cemented positive lens of a negative lens and a positive lens. The third lens group G3 is constituted by a cemented negative lens of a positive lens and a negative lens.

Figure 7B:
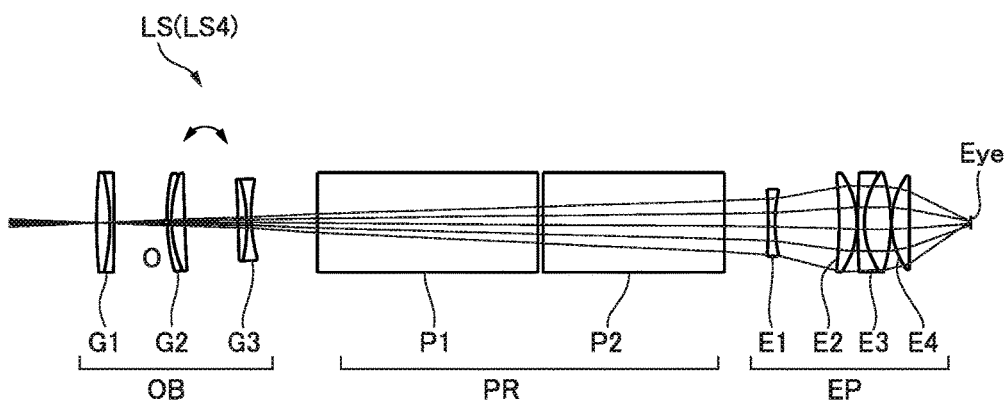
FIG. 7B is an optical path diagram depicting a change in principal rays during image shake correction.

The second lens group G2 and the third lens group G3, which constitute an image-shake preventing optical system, rotate together around a rotation center point O (around an axis parallel with the x axis), so as to correct an image generated by image shake or the like. The rotation center point O is disposed on the vertex of the surface closest to the object in the second lens group G2 (optical axis). FIG. 7B shows the changes in principal rays at 0% (on the axis) and 50% and 100% (maximum angle of view) when image shake is corrected (when the image-shake preventing optical system is rotated).

The erecting optical system PR is constituted by an erecting prism using an auxiliary prism P1 and a roof prism P2. The eyepiece optical system EP is constituted by a first eyepiece lens E1 which is a single lens, a second eyepiece lens E2 which is a single lens, a third eyepiece lens E3 which is a cemented lens, and a fourth eyepiece lens E4 which is a single lens. To simplify the description, the auxiliary prism P1 and the roof prism P2 are drawn only as outlines in FIG. 5.

Table 4 shows each data of Example 4. The radius of curvature R of Surface 1 to Surface 23 in Table 4 correspond to the reference symbols R1 to R23 related to Surface 1 to Surface 23 in FIG. 7 respectively. Surface 16 is a virtual surface and is omitted in FIG. 7. The surface distance from Surface 24 is a distance from the last lens surface (Surface 23) to the eye point Eye (eye relief).

TABLE 4

[Spec Data]

Aperture (Dm): 20
Magnification: 12
Real field of view (unit: °): 5
f = 150.0053
f1 = 166.6661
fv1 = 72.36753
fv2 = −50.5549
β1 = 0.321433
β2 = 2.80007
β12 = 0.900035
Od = 0

[Lens Data]

| Surface number | R | D | nd | vd |
|---|---|---|---|---|
| 1 | 108.6172 | 3 | 1.58913 | 61.25 |
| 2 | −46.2598 | 1 | 1.62004 | 36.40 |
| 3 | −494.442 | 11.97135 | | |
| 4 | 43.62804 | 1 | 1.67270 | 32.18 |
| 5 | 27.08974 | 3 | 1.67000 | 57.35 |
| 6 | 429.718 | 12.22934 | | |
| 7 | −800 | 2 | 1.67270 | 32.18 |
| 8 | −33.3302 | 1 | 1.67000 | 57.35 |
| 9 | 35.27626 | 15 | | |
| 10 | ∞ | 50 | 1.56883 | 56.04 |
| 11 | ∞ | 1.2 | | |
| 12 | ∞ | 41 | 1.56883 | 56.04 |
| 13 | ∞ | 10 | | |
| 14 | −90 | 1.5 | 1.51680 | 64.20 |
| 15 | 31.53715 | 6.65991 | | |
| 16 | ∞ | 8.011748 | | |
| 17 | −90 | 4 | 1.51680 | 64.20 |
| 18 | −18.8259 | 0.2 | | |
| 19 | 193.0207 | 1.5 | 1.84666 | 23.78 |
| 20 | 18.62844 | 6 | 1.69680 | 55.46 |
| 21 | −35.0506 | 0.2 | | |

TABLE 4-continued

| 22 | 17.5 | 4 | 1.62041 | 60.34 |
|---|---|---|---|---|
| 23 | 133403 | 0 | | |
| 24 | — | 13.97049 | | |

[Rotational Displacement Data]

| Surface number | Δy (5°) | Δz (5°) |
|---|---|---|
| 4 | 0.0000 | 0.0000 |
| 5 | 0.0872 | −0.0038 |
| 6 | 0.3486 | −0.0152 |
| 7 | 1.4145 | −0.0618 |
| 8 | 1.5888 | −0.0694 |
| 9 | 1.6759 | −0.0732 |

[Conditional Expression Correspondence Value]

Conditional expression (1) |(Dm/f1) × θm| = 0.010472
Conditional expression (2) |fv1/f| = 0.5088
Conditional expression (3) |fv2/f| = 0.3292
Conditional expression (4) |β12| = 0.900035

As a result, this example satisfies all the conditional expressions (1) to (4).

Figure 8:
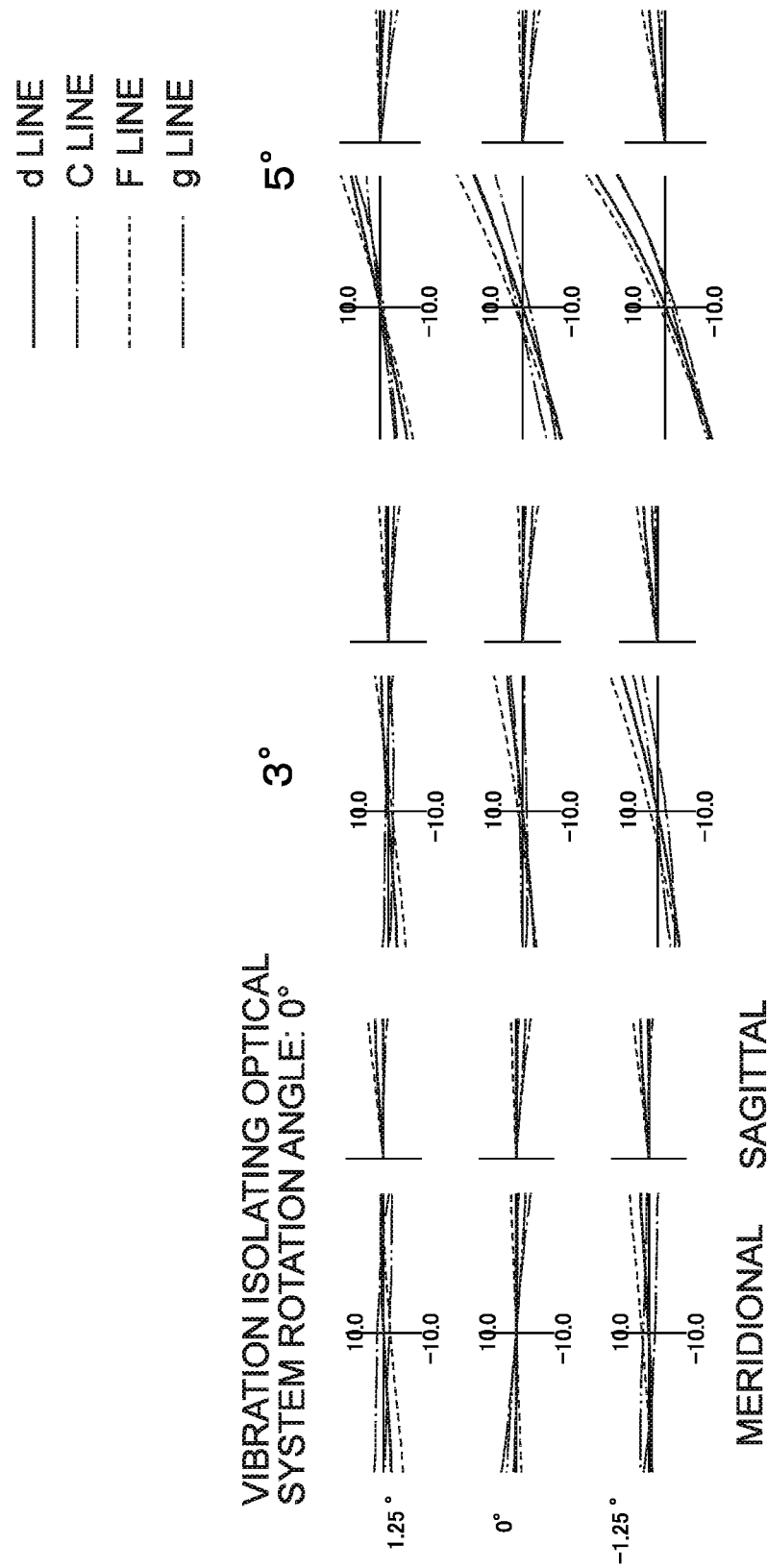
FIG. 8 shows graphs showing various aberrations of the observation optical system according to Example 4.

FIG. 8 shows graphs showing lateral aberrations (unit: ') at 0% (on the axis), and 50% (angle of view: ±1.25°) when the image-shake preventing optical system of Example 4 is rotated by 0°, 3° and 5°. If the rotation angle θ of the image-shake preventing optical system is 3° (0.052 [rad]), the image-shake preventing correction angle on the object side corresponds to 0.75°. If the rotation angle θ of the image-shake preventing optical system is 5° (0.087 [rad]), the image-shake preventing correction angle on the object side corresponds to 1.13°. As each graph showing aberrations clarifies, various aberrations are corrected well, and excellent imaging performance is demonstrated in Example 4. As a result, excellent optical performance can be guaranteed for a telescope TSC or a binocular telescope BFG by installing the observation optical system LS4 of Example 4.

According to each example, a telescope TSC or a binocular telescope BFG that has an image-shake preventing function which can handle significant image shake or the like, while still maintaining good optical performance, can be implemented.

In each embodiment described above, the following content can be adopted within a range where the optical performance is not diminished.

In the examples of each embodiment, the objective optical system constituted by three lens groups was shown, but the present invention can also be applied to a configuration using a different number of lens groups, such as four lens groups and five lens groups. In the configuration, a lens or a lens group may be added to the side closest to the object, or a lens or a lens group may be added to the side closest to the eye point. A "lens group" refers to a portion having at least one lens isolated by an air space which changes upon zooming.

In each embodiment described above, a lens surface may be formed to be a spherical surface or a plane, or an aspherical surface. If the lens surface is a spherical surface or a plane, lens processing, assembly and adjustment are easy, and deterioration of optical performance, due to an error in processing, assembly and adjustment, can be prevented. Moreover, even if the image plane is shifted, the drawing performance is not affected very much, which is desirable. If the lens surface is an aspherical surface, the aspherical surface can be any of an aspherical surface generated by grinding, a glass molded aspherical surface generated by forming glass in an aspherical shape using a die, and a composite aspherical surface generated by forming resin on the surface or the glass to be an aspherical shape. The lens surface may be a diffraction surface, and the lens may be a refractive index distributed lens (GRIN lens) or a plastic lens.

In each embodiment described above, the aperture stop is disposed in the objective optical system OB. For example, the aperture stop is disposed on the plane of incidence of the first lens group G1. The role of the aperture stop may be substituted by the frame of the lens, without disposing a separate element as the aperture stop.

In each embodiment described above, each lens surface may be coated with an anti-reflection film which has high transmittance in a wide wavelength region, in order to decrease flares and ghosts, and implement high optical performance with high contrast.

In each embodiment described above, a zoom lens (variable power optical system) may be included. For example, an eyepiece zoom optical system may be disposed instead of the eyepiece optical system of each embodiment. It is preferable that the eyepiece zoom optical system is constituted by three lens groups (two positive lens components and one negative lens component), and the lens components are disposed to be concave, convex and convex in order from the object, with an air space between the lens components.

In each embodiment described above, the optical axis of the objective optical system OB is an axis common to the optical axis of the first lens group G1, the optical axis of the second lens group G2, and the optical axis of the third lens group G3. If at least one of the optical axis of the first lens group G1, the optical axis of the second lens group G2, and the optical axis of the third lens group G3 exists on a different axis, one optical axis out of the optical axis of the first lens group G1, the optical axis of the second lens group G2 and the optical axis of the third lens group G3 may be regarded as the optical axis of the objective optical system OB.

EXPLANATION OF NUMERALS AND CHARACTERS

TSC telescope
BFG binocular telescope
LS Observation optical system
OB objective optical system
G1 first lens group
G2 second lens group
G3 third lens group
PR erecting optical system
EP eyepiece optical system

The invention claimed is:
1. An optical device comprising:
an objective optical system; and
an eyepiece optical system for observing an image formed by the objective optical system,
the objective optical system including, in order from an object, a first lens group, a second lens group and a third lens group, and
the second lens group and the third lens group rotating together around a point between the second lens group and the third lens group on an optical axis of the objective optical system in order to correct the image, the rotation being within a plane containing the optical axis.

2. The optical device according to claim 1, wherein
the second lens group and the third lens group rotate together within a predetermined angle range with respect to an optical axis of the first lens group, in order to correct the image, and
the second lens group has a positive refractive power and the third lens group has a negative refractive power.

3. The optical device according to claim 2, wherein the objective optical system satisfies the following conditional expression:

$$0.00<|(Dm/f1)\times\theta m|<0.07$$

where
f1: focal length of the first lens group
Dm: effective diameter of the first lens group
θm: maximum rotation angle of the second lens group and the third lens group.

4. The optical device according to claim 2, wherein the objective optical system satisfies the following conditional expressions:

$$0.0<|fv1/f|<1.2$$

$$0.0<|fv2/f|<1.2$$

where
f: focal length of the objective optical system
fv1: focal length of the second lens group
fv2: focal length of the third lens group.

5. The optical device according to claim 2, wherein the objective optical system satisfies the following conditional expression:

$$0.5<|\beta 12|<1.5$$

where
β12: imaging magnification of a lens system constituted by the second lens group and the third lens group with respect to an object at infinity.

6. The optical device according to claim 2, wherein the second lens group and the third lens group are each constituted by a cemented lens.

7. The optical device according to claim 2, further comprising a lens barrel for holding the objective optical system and the eyepiece optical system, wherein
the first lens group is fixed relative to the lens barrel.

8. The optical device according to claim 1, wherein the objective optical system satisfies the following conditional expression:

$$0.00<|(Dm/f1)\times\theta m|<0.07$$

where
f1: focal length of the first lens group
Dm: effective diameter of the first lens group
θm: maximum rotation angle of the second lens group and the third lens group.

9. The optical device according to claim 1, wherein the objective optical system satisfies the following conditional expressions:

$$0.0<|fv1/f|<1.2$$

$$0.0<|fv2/f|<1.2$$

where
f: focal length of the objective optical system
fv1: focal length of the second lens group
fv2: focal length of the third lens group.

10. The optical device according to claim 1, wherein the objective optical system satisfies the following conditional expression:

$$0.5<|\beta 12|<1.5$$

where
β12: imaging magnification of a lens system constituted by the second lens group and the third lens group with respect to an object at infinity.

11. The optical device according to claim 1, wherein the second lens group and the third lens group are each constituted by a cemented lens.

12. The optical device according to claim 1, further comprising a lens barrel for holding the objective optical system and the eyepiece optical system, wherein
the first lens group is fixed relative to the lens barrel.

13. The optical device according to claim 1, wherein
the first lens group is fixed during the rotation of the second and third lens groups about the point between the second and third lens groups to correct the image.

14. A binocular telescope comprising two observation optical systems, each including:
an objective optical system;
an erecting optical system for erecting an image formed by the objective optical system; and
an eyepiece optical system for observing the image which is formed by the objective optical system and erected by the erecting optical system,
the objective optical system including, in order from an object, a first lens group, a second lens group, and a third lens group, and
the second lens group and the third lens group rotating together around a point between the second lens group and the third lens group on an optical axis of the objective optical system in order to correct the image, the rotation being within a plane containing the optical axis.

15. The binocular telescope according to claim 14, wherein
the second lens group has a positive refractive power and the third lens group has a negative refractive power, and the objective optical system satisfies the following conditional expressions:

$$0.0<|fv1/f|<1.2$$

$$0.0<|fv2/f|<1.2$$

where
f: focal length of the objective optical system
fv1: focal length of the second lens group
fv2: focal length of the third lens group.

16. The binocular telescope according to claim 14, wherein
the first lens group is fixed during the rotation of the second and third lens groups about the point between the second and third lens groups to correct the image.

17. A telescope comprising:
an objective optical system;
an erecting optical system for erecting an image formed by the objective optical system; and
an eyepiece optical system for observing the image which is formed by the objective optical system and erected by the erecting optical system,
the objective optical system including, in order from an object, a first lens group, a second lens group, and a third lens group, and
the second lens group and the third lens group rotating together around a point between the second lens group and the third lens group on an optical axis of the objective optical system in order to correct the image, the rotation being within a plane containing the optical axis.

18. The telescope according to claim 17, wherein the second lens group has a positive refractive power and the third lens group has a negative refractive power, and the objective optical system satisfies the following conditional expressions:

$$0.0<|fv1/f|<1.2 \quad (2)$$

$$0.0<|fv2/f|<1.2 \quad (3)$$

where
f: focal length of the objective optical system
fv1: focal length of the second lens group
fv2: focal length of the third lens group.

19. The telescope according to claim 17, wherein the first lens group is fixed during the rotation of the second and third lens groups about the point between the second and third lens groups to correct the image.

20. An optical device comprising:
an objective optical system; and
an eyepiece optical system for observing an image formed by the objective optical system,
the objective optical system including, in order from an object, a first lens group, a second lens group having a positive refractive power and a third lens group having a negative refractive power, and
the second lens group and the third lens group rotating together around a point on an optical axis of the objective optical system to correct the image, and
the optical device satisfies the following conditional expressions:

$$0.0<|fv1/f|<1.2 \quad (2)$$

$$0.0<|fv2/f|<1.2 \quad (3)$$

where
f: focal length of the objective optical system
fv1: focal length of the second lens group
fv2: focal length of the third lens group.

21. The optical device according to claim 20, wherein the point about which the second lens group and the third lens group rotate together is between the second lens group and the third lens group.

22. The optical device according to claim 21, wherein the objective optical system satisfies the following conditional expression:

$$0.5<|\beta12|<1.5$$

where
$\beta12$: imaging magnification of a lens system constituted by the second lens group and the third lens group with respect to an object at infinity.

23. The optical device according to claim 22, wherein the second lens group and the third lens group are each constituted by a cemented lens.

24. The optical device according to claim 23, further comprising a lens barrel for holding the objective optical system and the eyepiece optical system, wherein the first lens group is fixed relative to the lens barrel.

25. The optical device according to claim 20, wherein the first lens group is fixed during the rotation of the second and third lens groups about the point on the optical axis to correct the image.

* * * * *